R. T. SMITH, Jr.
VEHICLE WHEEL.
APPLICATION FILED JAN. 15, 1913.
1,160,779.
Patented Nov. 16, 1915.
2 SHEETS—SHEET 1.
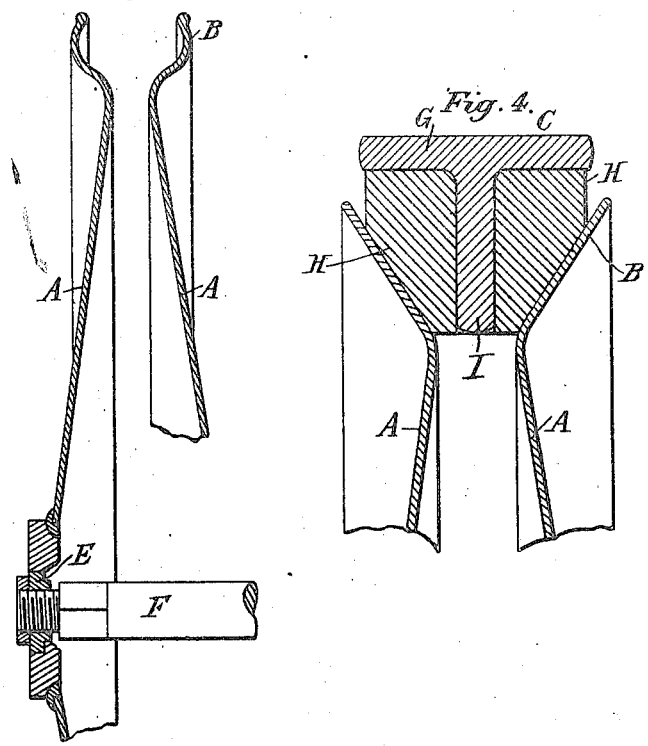
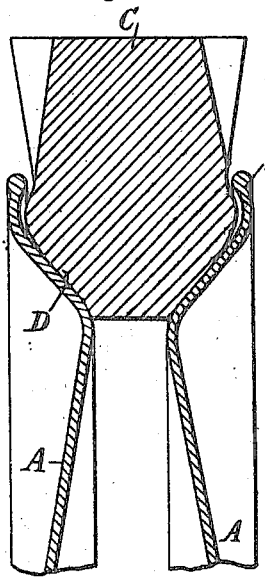
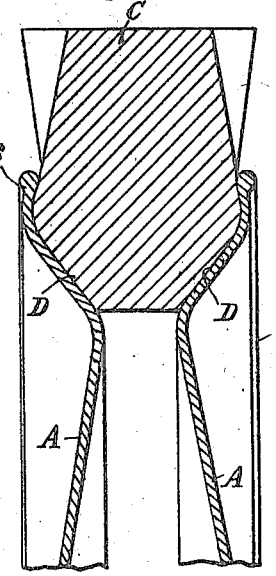
WITNESSES
INVENTOR
Robert Thomas Smith jr.
By Howson and Howson
his Attorneys

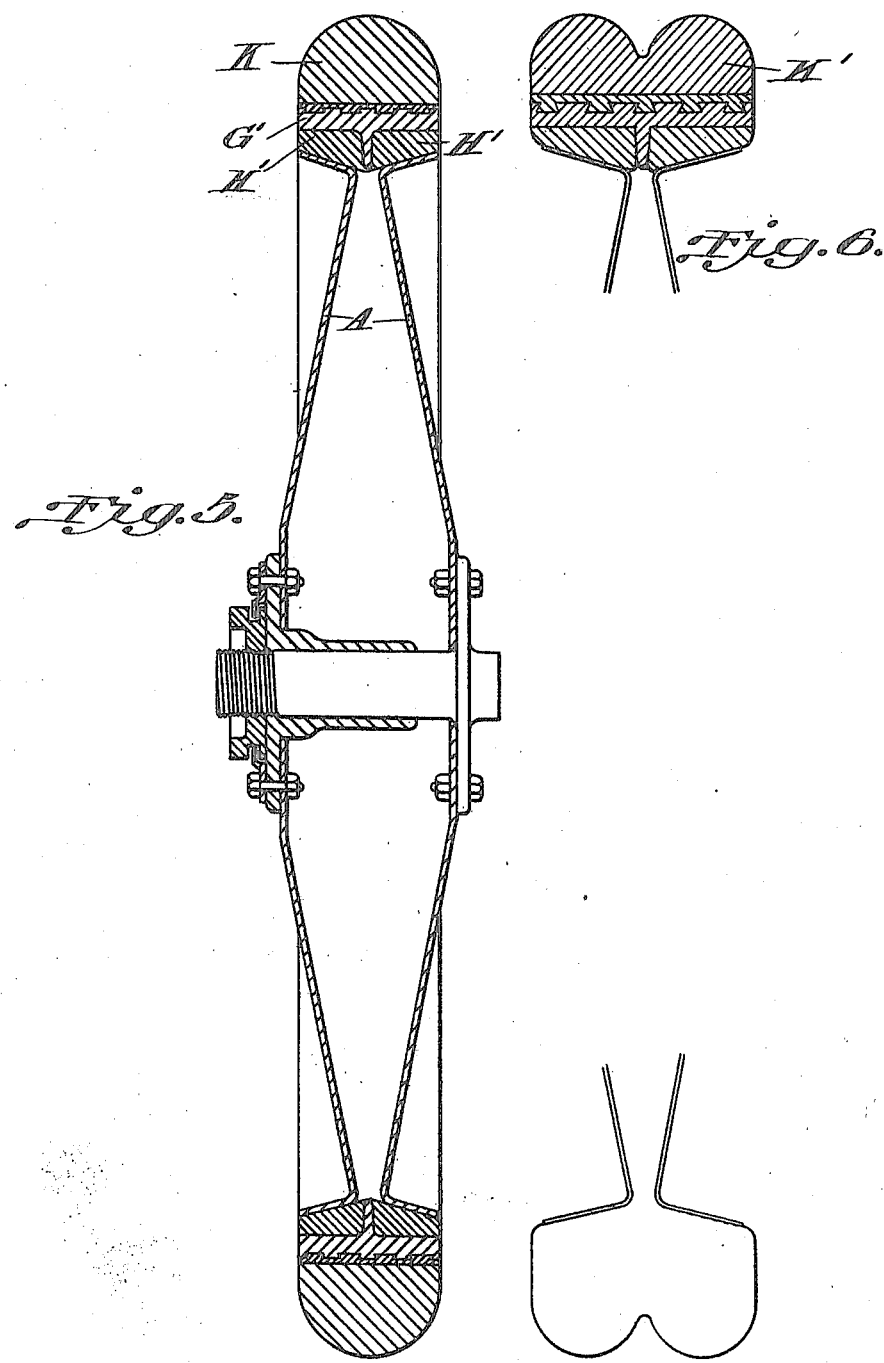

UNITED STATES PATENT OFFICE.

ROBERT THOMAS SMITH, JR., OF WARRINGTON, ENGLAND.

VEHICLE-WHEEL.

1,160,779.　　　　　Specification of Letters Patent.　　Patented Nov. 16, 1915.

Application filed January 15, 1913.　Serial No. 742,201.

*To all whom it may concern:*

Be it known that I, ROBERT THOMAS SMITH, Jr., a subject of the King of Great Britain and Ireland, of 111 Lovely Lane, Warrington, in the county of Lancaster, England, have invented new and useful Improvements in Vehicle-Wheels, of which the following is a specification.

The present invention relates to improved means for securing the rim to the body of a wheel of the well known "Lynton" type in which the rim is held in position between side plates drawn together by means of a draw-up nut on the wheel axle.

The present improvement consists in utilizing not only the direct clamping action effected by the nut, but also the radial expansion of the cupped side plates under the influence of the draw-up nut to secure a more efficient circumferential grip upon the tire.

In the accompanying drawings, Figure 1 is a partial vertical section through a Lynton wheel; Fig. 2 is an enlarged sectional view of a peripheral section before the application of the draw-up bolt; Fig. 3 is a similar view after the bolt has been drawn up; Fig. 4 is a similar view showing a metal rim; Fig. 5 is a cross section through a Lynton wheel showing a metal rim with solid tire thereon; and Fig. 6 is a broken section of a modified form of the latter.

Referring first to Figs. 1 to 3, the present wheel comprises cupped side plates A arranged on the spindle F with their concave faces juxtaposed. Their outer peripheries are annularly splayed out or grooved at B to receive the rubber tire C, the inner face of which is correspondingly shaped. When the tire is placed in the grooves B and the draw-up nut E screwed up on the axle F, the radial outward movement of the peripheries of the plates, as the latter are flattened by their mutual approach, stretches or expands the rubber rim C and thus increases its grip upon the splayed peripheries of the wheel plates.

In Fig. 4 the invention is applied to wheels having metal treads. The tread or rim G comprises a metal band T-shaped in cross section, the web I being arranged centrally on the inner periphery of the band. Wedge blocks H, preferably in segmental form, are arranged around the wheel, between the flared peripheries B and the web I. Consequently on the draw-up of the nut E the wedge shaped blocks H are pressed hard against the inner periphery and web of the tread G, the amount of pressure varying of course with the pressure of the side plates A. These blocks H may be of rubber, wood, fiber or other suitable material capable of being stretched, or expanded, so as to press hard against the metal tread.

In Fig. 5 substantially the same peripheral construction is employed, the only substantial difference being found in the fact that the rim $G^1$ carries a rubber tread K. The same is true of Fig. 6 in which tread $K^1$ is of the double tread type to which *per se* no claim is made.

I claim as my invention:—

A vehicle wheel comprising a pair of cupped disks having their concave faces juxtaposed and being provided with outwardly flared peripheral flanges, an endless metal rim located between said flanges and having a central web extending inwardly from the inner periphery of said rim, expansible wedge-shaped members lying on each side of said web between the latter and the outwardly inclined flanges on the peripheries of the disks and means for forcing said disks together whereby said wedge-shaped members are pressed against the inner periphery of said rim by the resulting radial expansion of said peripheral flanges, substantially as described.

In testimony whereof I have signed my name to this specification in the presence of two subscribing witnesses.

ROBERT THOMAS SMITH, JUNIOR.

Witnesses:
　　WM. PIERCE,
　　H. WATSON.